(12) United States Patent
DeFelice

(10) Patent No.: US 10,753,493 B2
(45) Date of Patent: Aug. 25, 2020

(54) VALVE WITH SEGMENTED SPRING GUIDE ASSEMBLY

(71) Applicant: Hamilton Sundstrand Corporation, Charlotte, NC (US)

(72) Inventor: Robert DeFelice, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 223 days.

(21) Appl. No.: 15/940,262

(22) Filed: Mar. 29, 2018

(65) Prior Publication Data

US 2019/0301624 A1    Oct. 3, 2019

(51) Int. Cl.
| F16K 15/06 | (2006.01) |
| F02C 9/18 | (2006.01) |
| F16K 31/122 | (2006.01) |
| F16K 17/20 | (2006.01) |
| F16K 24/02 | (2006.01) |

(52) U.S. Cl.
CPC .............. *F16K 15/066* (2013.01); *F02C 9/18* (2013.01); *F16K 17/20* (2013.01); *F16K 31/1221* (2013.01); *F05D 2220/323* (2013.01); *F16K 24/02* (2013.01); *Y10T 137/7829* (2015.04); *Y10T 137/7925* (2015.04)

(58) Field of Classification Search
CPC ...... F16K 17/20; F16K 24/02; F16K 31/1221; F16K 15/066; F02C 9/18; F05D 2220/323; F05D 2220/329; F05D 2220/34; Y10T 137/7925; Y10T 137/7929
USPC .................................. 251/77, 80, 81, 82, 83
See application file for complete search history.

(56) References Cited

U.S. PATENT DOCUMENTS

| 1,884,548 A | * | 10/1932 | Boynton | ............... E21B 43/123 |
| | | | | 137/155 |
| 2,056,133 A | * | 9/1936 | Corey | ..................... F16N 23/00 |
| | | | | 137/454.5 |
| 2,437,631 A | * | 3/1948 | Wood | ..................... F16F 1/041 |
| | | | | 248/613 |

(Continued)

FOREIGN PATENT DOCUMENTS

| DE | 202008015498 U1 | 4/2010 |
| EP | 3241966 A1 | 11/2017 |

(Continued)

OTHER PUBLICATIONS

European Patent Office, Extended European Search Report, Application No. 19154255.4-1015, dated Jul. 23, 2019 8 (pp.).

*Primary Examiner* — Craig M Schneider
*Assistant Examiner* — Frederick D Soski
(74) *Attorney, Agent, or Firm* — Cantor Colburn LLP

(57) ABSTRACT

Disclosed is a method of applying a biasing force against a piston in a valve as the piston moves along a piston stroke axis in a first direction and an opposing second direction, the piston having a first axial end that is a distal end of the piston, the method including: moving the piston along a piston stroke axis in the first direction and the opposing second direction, wherein while moving the piston along the piston stroke axis: applying a first biasing force in the second direction against the first axial end of the piston from a first spring, and applying a second biasing force in the second direction against the first spring from a second spring.

11 Claims, 1 Drawing Sheet

(56) References Cited

U.S. PATENT DOCUMENTS

| | | | | |
|---|---|---|---|---|
| 2,702,044 A * | 2/1955 | Johnston | F16K 15/063 | 137/102 |
| 2,872,149 A * | 2/1959 | Battey | F16K 31/1262 | 251/25 |
| 3,032,061 A * | 5/1962 | Silver | F16K 17/10 | 137/529 |
| 3,112,763 A * | 12/1963 | Tennis | F16K 17/18 | 137/493.5 |
| 3,171,440 A * | 3/1965 | Napolitano | F16K 1/42 | 137/630.19 |
| 3,503,601 A * | 3/1970 | Wells | F16F 3/04 | 267/169 |
| 3,556,504 A * | 1/1971 | Sinclair | B61F 5/06 | 267/4 |
| 3,572,678 A * | 3/1971 | Jerz, Jr. | B60G 15/065 | 267/225 |
| 3,603,610 A * | 9/1971 | Thompson | B60G 11/16 | 267/221 |
| 3,604,450 A * | 9/1971 | Botkin | F16K 17/18 | 137/493.4 |
| 4,033,542 A * | 7/1977 | Moehle | B60G 99/002 | 248/601 |
| 4,133,178 A * | 1/1979 | Brooks, Sr. | B60T 11/20 | 137/493.8 |
| 4,210,170 A * | 7/1980 | Sutton | E02F 9/226 | 137/493.4 |
| 4,237,920 A * | 12/1980 | Norman | F16K 31/1221 | 137/243.3 |
| 4,354,523 A * | 10/1982 | Hochmuth | F16L 29/007 | 137/322 |
| 4,365,647 A * | 12/1982 | Taylor | F15B 13/02 | 137/489 |
| 4,392,507 A * | 7/1983 | Harris | B60K 15/03519 | 137/38 |
| 4,403,740 A * | 9/1983 | Eblen | F02M 45/083 | 239/533.4 |
| 4,566,635 A * | 1/1986 | Trachte | F02M 45/08 | 137/506 |
| 4,637,419 A * | 1/1987 | Hughes | F16L 37/002 | 137/236.1 |
| 4,669,668 A * | 6/1987 | Ogawa | F02M 61/161 | 239/533.5 |
| 4,684,067 A * | 8/1987 | Cotter | F02M 45/083 | 123/467 |
| 4,768,719 A * | 9/1988 | Straubel | F02M 45/083 | 239/533.4 |
| 4,872,365 A * | 10/1989 | Wolf | F16K 31/465 | 74/501.6 |
| 5,165,607 A * | 11/1992 | Stevens | F02M 45/083 | 239/533.4 |
| 5,205,492 A * | 4/1993 | Khinchuk | F02M 45/12 | 239/533.4 |
| 5,211,340 A * | 5/1993 | Yoshizu | F02M 45/08 | 239/443 |
| 5,244,152 A * | 9/1993 | Hofmann | F02M 45/083 | 239/533.4 |
| 5,263,695 A * | 11/1993 | Bianchi | B60G 11/32 | 267/225 |
| 5,267,694 A * | 12/1993 | Frank | F02M 45/083 | 239/533.3 |
| 5,379,982 A * | 1/1995 | Koyomogi | F16K 1/10 | 137/375 |
| 5,479,779 A * | 1/1996 | Havdal | F16D 25/088 | 60/591 |
| 5,511,868 A * | 4/1996 | Eftefield | B62D 55/30 | 267/175 |
| 5,544,688 A * | 8/1996 | Freigang | B60C 23/003 | 152/415 |
| 5,743,470 A * | 4/1998 | Schlaf | F02M 45/083 | 239/533.4 |
| 6,371,441 B1 * | 4/2002 | Mattes | F02M 45/083 | 123/446 |
| 6,443,180 B1 * | 9/2002 | Samuelson | F16K 17/30 | 137/460 |
| 6,793,194 B1 * | 9/2004 | Grinberg | F16K 31/528 | 251/58 |
| 6,837,266 B2 * | 1/2005 | Fredrickson | F16K 17/065 | 137/529 |
| 6,964,280 B1 * | 11/2005 | Trimble | F16K 15/063 | 137/454.5 |
| 6,986,363 B1 * | 1/2006 | Trimble | F16K 17/044 | 137/493.6 |
| 7,066,199 B1 * | 6/2006 | Trimble | F16K 17/196 | 137/493.5 |
| 7,320,334 B1 * | 1/2008 | Trimble | F15B 11/0445 | 137/493.1 |
| 7,350,774 B2 * | 4/2008 | Chun | F16F 1/041 | 267/169 |
| 7,392,823 B2 * | 7/2008 | Dong | F16K 17/196 | 137/493.6 |
| 7,744,062 B2 * | 6/2010 | Dalluge | F16K 31/1262 | 251/284 |
| 8,656,946 B2 * | 2/2014 | Anderson | F16K 15/042 | 137/513 |
| 9,410,633 B2 * | 8/2016 | Marrucci | F16K 17/065 | |
| 10,337,630 B2 * | 7/2019 | Apadula | F16K 17/044 | |
| 2008/0210313 A1 * | 9/2008 | Schniederjan | F16K 17/044 | 137/535 |
| 2011/0175009 A1 * | 7/2011 | Kristoffersen | G05D 16/103 | 251/321 |
| 2016/0061482 A1 * | 3/2016 | Mackie | F16K 37/0008 | 251/77 |
| 2016/0153551 A1 * | 6/2016 | Schiele | F16H 61/0276 | 137/511 |
| 2019/0331030 A1 * | 10/2019 | Kelly | F04D 27/0215 | |

FOREIGN PATENT DOCUMENTS

| | | |
|---|---|---|
| FR | 1327130 | 5/1963 |
| WO | 2015195810 A2 | 12/2015 |

* cited by examiner

VALVE WITH SEGMENTED SPRING GUIDE ASSEMBLY

STATEMENT OF FEDERAL SUPPORT

This invention was made with Government support under FA8626-16-C-2139 awarded by The United States Air Force. The Government has certain rights in the invention.

BACKGROUND

Exemplary embodiments pertain to the art of passive bleed valves and more specifically to a segmented spring guide for a piston within a pneumatic passive bleed valves assembly.

Pneumatic passive bleed valves in aircraft engines use springs with varying degrees of success. Such valve include a piston that is held in place by a spring and the motion of the piston causes the spring to compress. With pneumatic passive bleed valves on aircraft engines, a compressed spring may endure high levels of vibration in a low damping medium such as air. A resulting axial resonance may cause high cycle fatigue and wear failures.

BRIEF DESCRIPTION

Disclosed is a valve comprising: a piston movable along a piston stroke axis in a first axial direction and an opposing second axial direction, the piston having a first axial end that is a distal end of the piston; and a segmented spring guide assembly configured to engage the distal end of the piston along the piston stroke axis, the segmented spring guide assembly comprising: a first spring guide assembly that extends distally from the piston along the piston stroke axis, the first guide assembly including a first spring that is a first coil spring and a first spring guide for guiding the first spring; a second spring guide assembly that extends distally from the first spring guide assembly along the piston stroke axis, the second spring guide assembly including a second spring that is a second coil spring and a second spring guide for guiding the second spring; and wherein the first spring guide assembly and the second spring guide assembly are movably connected to each other along the piston stroke axis to form the segmented guide spring assembly, and wherein when the piston travels along the piston stroke axis: the first spring engages the piston and the first spring guide, and the second spring engages the first spring guide and the second spring guide.

In addition to one or more of the above disclosed features, or as an alternative the first spring and second spring have a same span along the piston stroke axis.

In addition to one or more of the above disclosed features, or as an alternative: the first spring guide includes a first elongated member extending through the first spring, a first distal end of the first spring guide including a first annular lip defining a first spring seat, the second spring guide including a second elongated member extending through the second spring, a second distal end of the second spring guide including a second annular lip defining a second spring seat, and wherein when the piston travels along the piston stroke axis, the first spring engages the piston and the first annular lip and the second spring engages the first annular lip and the second annular lip.

In addition to one or more of the above disclosed features, or as an alternative, the first annular lip is movable along the piston stroke axis and the second annular lip is fixed along the piston stroke axis.

In addition to one or more of the above disclosed features, or as an alternative, a connector extends internally between the first spring guide and the second spring guide to movably connect the first spring guide assembly and the second spring guide assembly.

In addition to one or more of the above disclosed features, or as an alternative, the connector has a length that enables the first spring guide and the second spring guide to maintain sliding contact while the piston moves along the piston stroke axis.

In addition to one or more of the above disclosed features, or as an alternative, the connector is fixed to one of the first spring guide and the second spring guide and slidingly engages another of the first spring guide and the second spring guide.

In addition to one or more of the above disclosed features, or as an alternative, the connector is fixed to the first spring guide and slidingly engages the second spring guide.

In addition to one or more of the above disclosed features, or as an alternative, the connector is cylindrical having an outer diameter sized to slidingly engage an inner diameter of the second spring guide.

In addition to one or more of the above disclosed features, or as an alternative, the first spring guide and the second spring guide have a same span along the piston stroke axis.

Further disclosed is a method of applying a biasing force against a piston in a valve as the piston moves along a piston stroke axis in a first direction and an opposing second direction, the piston having a first axial end that is a distal end of the piston, the method comprising: moving the piston along a piston stroke axis in the first direction and the opposing second direction, wherein while moving the piston along the piston stroke axis: applying a first biasing force in the second direction against the first axial end of the piston from a first spring, and applying a second biasing force in the second direction against the first spring from a second spring.

In addition to one or more of the above disclosed steps or features, or as an alternative, the first biasing force is the same as the second biasing force.

In addition to one or more of the above disclosed steps or features, or as an alternative, the method includes actuating the valve pneumatically.

In addition to one or more of the above disclosed steps or features, or as an alternative, the first biasing force is from a first spring of a segmented spring guide assembly in the valve, the second biasing force is from a second spring of a segmented spring guide assembly in the valve, the first and second spring being disposed along the piston stroke axis.

In addition to one or more of the above disclosed steps or features, or as an alternative, the first spring is a first coil spring, the second spring is a second coil spring having a same length as the first spring.

In addition to one or more of the above disclosed steps or features, or as an alternative, the first coil spring is guided by a first spring guide of the segmented spring guide assembly, the second coil spring is guided by a second spring guide of the segmented spring guide assembly, the first and second spring guides being disposed along the piston stroke axis and being in sliding engagement while the piston moves in the first direction and the second direction.

In addition to one or more of the above disclosed steps or features, or as an alternative, the segmented spring guide assembly includes a connector providing the sliding engagement between the first spring guide and the second spring guide.

In addition to one or more of the above disclosed steps or features, or as an alternative, the connector is fixedly connected to the first spring guide and slidingly disposed within the second spring guide.

In addition to one or more of the above disclosed steps or features, or as an alternative, while moving the piston along the piston stroke axis, the method includes the first spring continuously engaging the piston and a first annular lip on the first spring guide, and the second spring continuously engaging the first annular lip and a second annular lip on the second spring guide.

BRIEF DESCRIPTION OF THE FIGURES

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
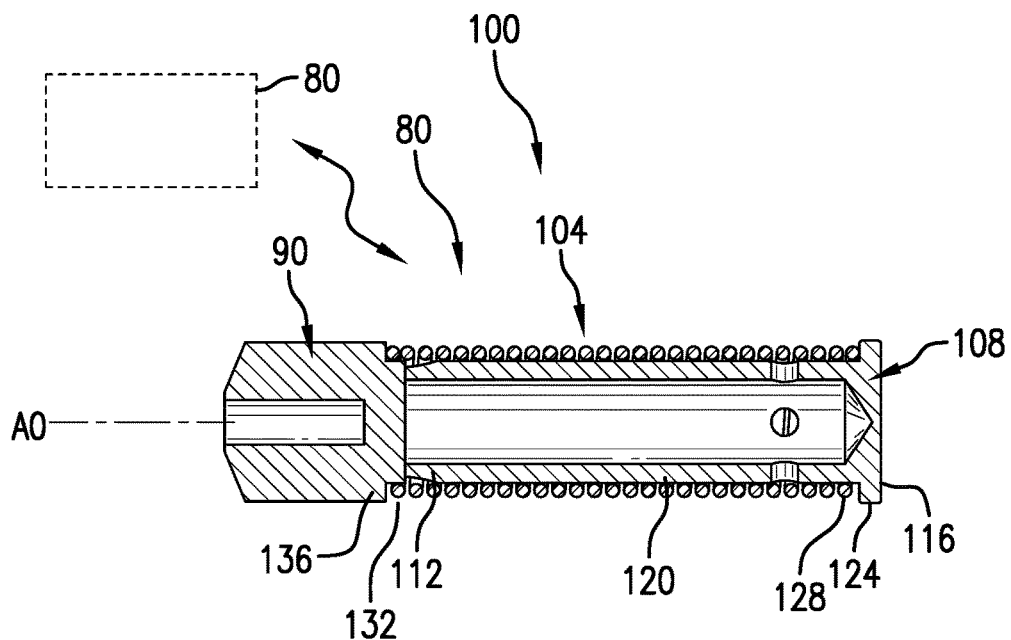
FIG. 1 is a cross-sectional side view of a portion of a valve with a piston and a prior art spring guide assembly.

Turning to FIG. 1, a valve 80 is illustrated schematically and a portion of a valve 80 according to the prior art is also shown in greater detail. The valve 80 could be a pneumatic valve such as an air or other fluid valve for use in an aircraft engine. The valve 80 includes a piston 90 that has a piston stroke axis A0. As illustrated, only a distal end of the piston 90 is shown. The valve 80 also includes a prior art spring guide assembly 100 which includes spring guide 108 and a spring 104.

As illustrated, the spring 104 is compressed against the spring guide 108 by action of the piston 90 along the piston axis A0. The spring guide 108 may include a proximate end 112, a distal end 116 and an elongated cylindrical member 120 extending therebetween. The cylindrical member 120 may be surrounded by the spring 104. The distal end 116 of the spring guide 108 may include an annular lip 124 defining a distal spring seat. During actuation of the piston 90 along the piston stroke axis A0, the annular lip 124 may be fixed to and contact the spring 104. A proximate end 132 of the spring 104 contacts a proximate spring seat 136 in the piston 90. In addition, the spring guide 108 may be alternatively disposed against and spaced from the piston 90. When the spring guide 108 is against the piston 90, the spring 104 is in a compressed state and when the spring guide 104 is spaced from the piston 90, the spring 104 is in an expanded state.

The spring 104 may have an associated natural frequency that may be excited due to external forces acting on the system at a similar frequency. In operation, the spring 104 is typically compressed in the valve 80 and endures high levels of vibration in a low damping medium such as air. Resulting axial resonance may cause high cycle fatigue and wear failures. Shifting the resonance frequency away from critical driving frequencies may reduce cycle fatigue.

Figure 2:
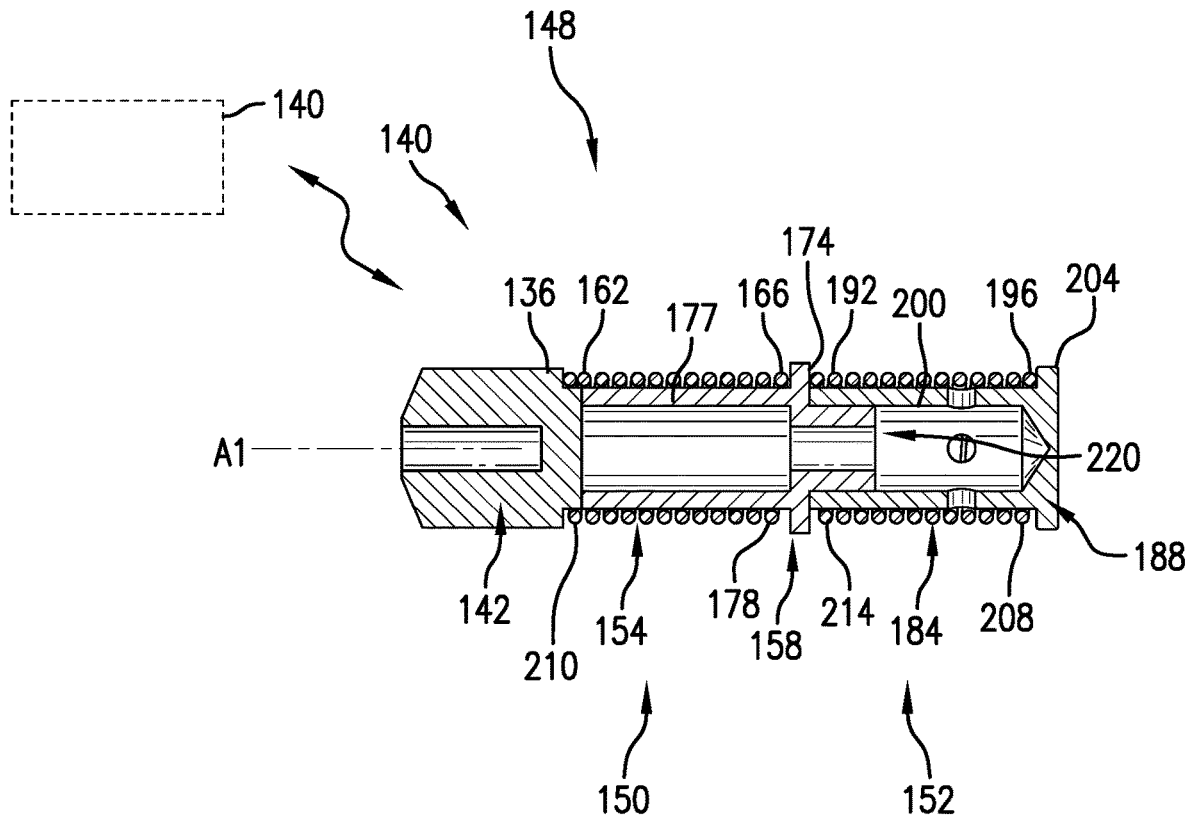
FIG. 2 is a cross-sectional side view of a portion of a valve with a piston and a segmented spring guide assembly according to one embodiment.

Turning now to FIG. 2, another valve 140 is illustrated schematically and a portion of the valve 140 according to a disclosed embodiment is also shown in greater detail. The valve 140 could be a pneumatic valve such as an air or other fluid valve for use in an aircraft engine. In one embodiment the valve 140 includes a segmented spring guide 148. The valve 140 includes a piston 142 having a piston stroke axis A1. The piston 142 may operationally engage with the segmented spring guide assembly 148, which extends distally from the piston 142 along the piston stroke axis A1. The segmented spring guide assembly 148 may include a plurality of spring guide assemblies, including a first spring guide assembly 150 and a second spring guide assembly 152, adjacently disposed along the piston stroke axis A1.

The first spring guide assembly 150 may include a first spring 154 which is a first coil spring guided by a first spring guide 158 which may be a first elongated spring guide. The piston stroke axis A1 may be the center axis for the first spring 154 and the first spring guide 158. The first spring guide 158 may include a first proximate end 162, a first distal end 166 and a first cylindrical member 170 extending therebetween. The first cylindrical member 170 may be a first elongated cylindrical member surrounded by the first spring 154. The first distal end 166 of the first spring guide 158 may include a first annular lip 174 defining a first distal spring seat. Continuously during actuation of the piston 142, the first annular lip 174 may contact a first distal end 178 of the first spring 154.

The second spring guide assembly 154 may include a second spring 184 which is a second coil spring guided by a second spring guide 188 which may be a second elongated spring guide. The piston stroke axis A1 may be the center axis for the second spring 184 and the second spring guide 188. The second spring guide 188 may include a second proximate end 192, a second distal end 196 and a second cylindrical member 200 extending therebetween. The second cylindrical member 200 may be a second elongated cylindrical member that surrounded by the second spring 184. The second distal end 196 of the second spring guide 188 may include a second annular lip 204 defining a second distal spring seat. Continuously during actuation of the piston 142, the second annular lip 204 may contact a second distal end 208 of the second spring 184.

During a piston stroke cycle in the valve 140, that is, as the piston 142 moves along piston stroke axis A1, various relational movements are occurring between the piston 142 and the segmented spring guide assembly 148 and within the segmented spring guide assembly 148. A first proximate end 210 of the first spring 154 may continuously contact the piston 142, and a second proximate end 214 of the second spring 184 may continuously contact the first annular lip 174. In addition, the first proximate end 162 of the first spring guide 158 may be alternatively disposed against and spaced from the piston 142, and the second proximate end 192 of the second spring guide may be alternatively disposed against and spaced from first annular lip 174.

During a piston stroke cycle within the valve 140, when the first spring guide 158 is against the piston 142, the first spring 154 may be in a compressed state. In addition when the second spring guide 188 is against the first annular lip 174, the second spring may 184 be in a compressed state. On the other hand, when the first spring guide 154 is spaced from the piston 142, the first spring 154 may be in an expanded state and when the second spring guide 188 is spaced from the first annular lip 174, the second spring may be in an expanded state.

To maintain an aligned configuration within the valve 140 along the piston stroke axis A1, a connector 220 may extend internally between the first spring guide assembly 150 and the second spring guide assembly 152. The connector 220 may be cylindrical and extend from the first distal end 166 of the first spring guide 158 into the second proximate end 214 of the second spring guide 188. The connector 220 may have a length that enables the first spring guide 158 and second spring guide 188 to maintain contact throughout the piston stroke cycle.

Utilizing a segmented spring guide assembly 148 with two spring guide assemblies 150, 152 in the valve 140 enables using two springs 154, 184 having an equivalent spring rate to that of a single spring with a same span along the piston stroke axis A1 (e.g., the two springs 154, 184 collectively have the same spring rate as spring 104 in FIG. 1). In addition, the two springs 154, 184 have a natural frequency that is double that of a configuration with the single spring having a same overall axial span. For example the following defines the spring constant and spring vibration characteristics for a coil spring:

$$k = \frac{Gd^4}{8ND^3}$$

$$f \sim \frac{d}{ND^2}\sqrt{\frac{G}{\rho}}$$

In the above formulae:
k: Spring rate for round wire
f: Natural frequency
d: Wire diameter
N: Number of active coils
D: Coil diameter
G: Material torsional modulus
ρ: Material density The spring constant for the spring 104 in FIG. 1 may be defined as follows:

$$k_0 = \frac{Gd^4}{8ND^3}$$

By cutting the axial length of the spring in half, as with springs 154, 184 in FIG. 2, all constants in the formula may remain the same except N, which may be halved. This may provide a natural frequency that is double of the original value:

$$k_{eq}^{-1} = k_A^{-1} + k_B^{-1}$$

$$k_A = k_B = \frac{Gd^4}{8\frac{N}{2}D^3} = 2k_0$$

$$k_{eq}^{-1} = (2k_0)^{-1} + (2k_0)^{-1}$$

$$k_{eq} = k_0$$

In addition, the equivalent spring rate for the combined springs 154, 184 in FIG. 2 may be equal to the spring rate for the spring 104 in FIG. 1. Thus, doubling the natural frequency moves resonance away from one or more driving frequencies, which may be critical driving frequencies. Additionally, higher frequencies may be less damaging to engine components with a same input level. Thus, the spring rate for the application may remain unchanged, while a risk of failure due to axial resonance may be minimized. Fewer failures due to high cycle fatigue and wear may lead to an overall longer average spring life.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A piston assembly comprising:
   a piston movable along a piston stroke axis in a first axial direction and an opposing second axial direction, the piston having a first axial end that is a distal end of the piston; and
   a segmented spring guide assembly configured to engage the distal end of the piston along the piston stroke axis, the segmented spring guide assembly comprising:
      a first spring guide assembly that extends distally from the piston along the piston stroke axis, the first spring guide assembly including a first spring that is a first coil spring and a first spring guide for guiding the first spring;
      a second spring guide assembly that extends distally from the first spring guide assembly along the piston stroke axis, the second spring guide assembly including a second spring that is a second coil spring and a second spring guide for guiding the second spring; and
   wherein the first spring guide assembly and the second spring guide assembly are movably connected to each other along the piston stroke axis to form the segmented guide spring assembly, and
   wherein when the piston travels along the piston stroke axis:
      the first spring engages the piston and the first spring guide, and
      the second spring engages the first spring guide and the second spring guide:
   wherein:
      a connector extends internally between the first spring guide and the second spring guide to movably connect the first spring guide assembly and the second spring guide assembly; and the connector has a length that enables the first spring guide and the second spring guide to maintain sliding contact while the piston moves along the piston stroke axis.

2. The piston assembly of claim 1, wherein the first spring and second spring have a same span as each other.

3. The piston assembly of claim 1, wherein:
the first spring guide includes a first elongated member extending through the first spring, a first distal end of the first spring guide including a first annular lip defining a first spring seat,
the second spring guide including a second elongated member extending through the second spring, a second distal end of the second spring guide including a second annular lip defining a second spring seat, and
wherein when the piston travels along the piston stroke axis, the first spring engages the piston and the first annular lip and the second spring engages the first annular lip and the second annular lip.

4. The piston assembly of claim 3, wherein the first annular lip is movable along the piston stroke axis and the second annular lip is fixed along the piston stroke axis.

5. The piston assembly of claim 1, wherein the connector is fixed to the first spring guide and is in sliding contact with the second spring guide.

6. The piston assembly of claim 1, wherein the connector is cylindrical having an outer diameter sized to be in sliding contact with an inner diameter of the second spring guide.

7. The piston assembly of claim 1, wherein the first spring guide and the second spring guide have a same span as each other.

8. A method of applying a biasing force against a piston in a piston assembly as the piston moves along a piston stroke axis in a first direction and an opposing second direction, the piston having a first axial end that is a distal end of the piston, the method comprising:
moving the piston along a piston stroke axis in the first direction and the opposing second direction,
wherein while moving the piston along the piston stroke axis:
applying a first biasing force in the second direction against the first axial end of the piston from a first spring, and
applying a second biasing force in the second direction against the first spring from a second spring;
wherein:
the first biasing force is from a first spring of a segmented spring guide assembly in the piston assembly, the second biasing force is from a second spring of a segmented spring guide assembly in the piston assembly, and the first and second spring are disposed along the piston stroke axis,
the first spring is a first coil spring, and the second spring is a second coil spring having a same length as the first coil spring;
the first coil spring is guided by a first spring guide of the segmented spring guide assembly, the second coil spring is guided by a second spring guide of the segmented spring guide assembly, the first and second spring guides are disposed along the piston stroke axis and are in sliding contact with each other while the piston moves in the first direction and the second direction;
the segmented spring guide assembly includes a connector providing the sliding engagement between the first spring guide and the second spring guide; and
the connector is fixedly connected to the first spring guide and slidingly disposed within the second spring guide.

9. The method of claim 8, including actuating the valve pneumatically.

10. The method of claim 8, wherein while moving the piston along the piston stroke axis, the method includes the first spring continuously engaging the piston and a first annular lip on the first spring guide, and the second spring continuously engaging the piston and a first annular lip and a second annular lip on the second spring guide.

11. The method of claim 10, wherein the first annular lip is movable along the piston stroke axis and the second annular lip is fixed along the piston stroke axis.

* * * * *